United States Patent
Odate

(10) Patent No.: US 8,944,206 B2
(45) Date of Patent: Feb. 3, 2015

(54) SEAT BELT APPARATUS

(71) Applicant: Honda Motor Co., Ltd., Tokyo (JP)

(72) Inventor: Shotaro Odate, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/147,719

(22) Filed: Jan. 6, 2014

(65) Prior Publication Data

US 2014/0191073 A1 Jul. 10, 2014

(30) Foreign Application Priority Data

Jan. 9, 2013 (JP) ................................. 2013-002022

(51) Int. Cl.
*B60R 22/03* (2006.01)
*B60R 22/44* (2006.01)

(52) U.S. Cl.
CPC ................. *B60R 22/44* (2013.01); *B60R 22/03* (2013.01); *B60R 2022/4473* (2013.01)
USPC ........... 180/268; 297/481; 242/390.9; 701/45

(58) Field of Classification Search
CPC ......................... B60R 22/03; B60R 2022/029
USPC ................ 180/268, 286; 297/481; 242/390.9; 701/45

See application file for complete search history.

(56) References Cited

U.S. PATENT DOCUMENTS

| | | | | |
|---|---|---|---|---|
| 4,650,215 | A * | 3/1987 | Sasaki et al. | 280/809 |
| 7,766,389 | B2 * | 8/2010 | Odate | 280/806 |
| 7,823,679 | B2 * | 11/2010 | Takao et al. | 180/268 |
| 7,946,375 | B2 * | 5/2011 | Tanaka | 180/268 |
| 8,109,460 | B2 * | 2/2012 | Odate et al. | 242/374 |
| 8,590,658 | B2 * | 11/2013 | Harada et al. | 180/268 |
| 2008/0290644 | A1 * | 11/2008 | Spahn et al. | 280/806 |
| 2012/0221210 | A1 * | 8/2012 | Adolfsson et al. | 701/45 |

FOREIGN PATENT DOCUMENTS

| | | | | |
|---|---|---|---|---|
| GB | 1210323 | * | 10/1970 | ............. B60R 21/01 |
| JP | 2011-084081 | | 4/2011 | |

* cited by examiner

*Primary Examiner* — Keith Frisby
(74) *Attorney, Agent, or Firm* — Rankin, Hill & Clark LLP

(57) ABSTRACT

A seat belt apparatus includes a reel, a motor, a clutch member, a belt reacher, a door opening/closing detection section, a wearing detection section and a motor control section. Once a change from an opened state to a closed state of a vehicle door is detected by the opening/closing detection section, the control section controls the motor so that the webbing is pulled out from the reel at a predetermined speed. Once wearing of the webbing is detected by the wearing detection section while the webbing is being pulled out at the predetermined speed, the control section controls the motor to stop pulling-out of the webbing. The predetermined speed is first kept at a constant speed, corresponding for example to a 10[%] duty cycle, for a predetermined time period and then caused to gradually decrease from the constant speed.

2 Claims, 8 Drawing Sheets

FIG.8A CLUTCH CANCELLATION / REVERSE MOTOR ROTATION CONTROL I
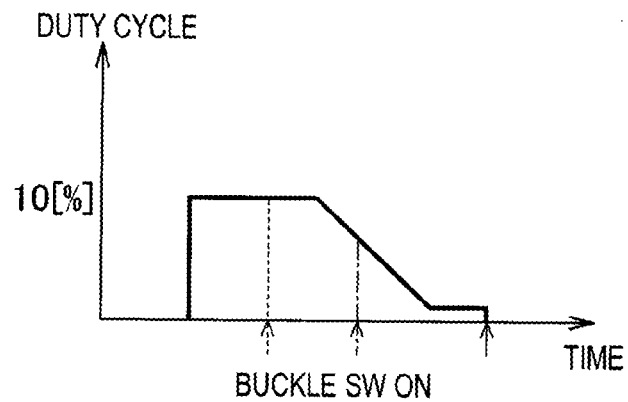
FIG.8B CLUTCH CANCELLATION / REVERSE MOTOR ROTATION CONTROL II
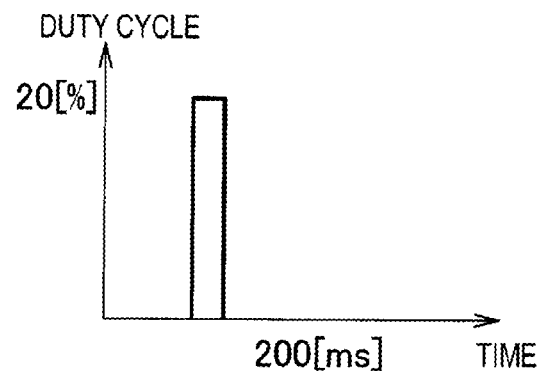

SEAT BELT APPARATUS

FIELD OF THE INVENTION

The present invention relates to seat belt apparatus having a belt reacher pivotable in such a manner as to tilt or fall forward together with a portion of a seat belt webbing (hereinafter referred to also as "webbing"), for example, in response to closing of a door of a vehicle.

BACKGROUND OF THE INVENTION

Japanese Patent Application Laid-open Publication No. 2011-84081 (hereinafter referred to as "the relevant patent literature"), for example, discloses a seat belt apparatus provided with a belt reacher. According to the disclosure of the relevant patent literature, a retractor is driven in a forward direction as a door of a vehicle opens, so that a webbing is rewound or take up and thus a belt reacher takes a substantial stand-up posture at a stored position. Further, the retractor is driven in a reverse direction as the vehicle door closes, and thus, a return spring urges the belt reacher forwardly until the belt reacher is held in a forwardly-inclined posture by a first or second stopper depending on a position of a seat.

Because the belt reacher in the seat belt apparatus disclosed in the relevant prior patent literature moves to the stored position in response to opening of the vehicle door, it does not get in the way when a vehicle occupant, such as a driver, gets in the vehicle. Also, because the belt reacher falls forward in response to opening of the vehicle door, the driver can easily hold the webbing or tongue plate and thus can easily insert the tongue plate into a buckle or fix the tongue plate to the buckle.

However, as the retractor is driven in the reverse direction in the seat belt apparatus disclosed in the relevant prior patent literature, the belt reacher merely falls from the stored position forward by the biasing force of the return spring and is held in the forwardly-inclined posture by the first or second stopper. In other words, by the retractor being merely driven in the reverse direction in the aforementioned manner, an uncomfortable feeling would be given to the vehicle occupant because the belt reacher falls forward at a predetermined constant speed and is then stopped suddenly by the first or second stopper.

SUMMARY OF THE INVENTION

In view of the foregoing prior art problems, it is an object of the present invention to provide an improved seat belt apparatus which can effectively reduce an uncomfortable feeling given to a vehicle occupant, such as a driver, when the belt reacher falls forward from the stored position.

In order to accomplish the above-mentioned object, the present invention provides an improved seat belt apparatus, which comprises: a webbing reel capable of taking up a webbing; an electric motor connected to the webbing reel via a transmission mechanism; a clutch member movable between a connecting position for keeping the electric motor and the webbing reel in a mutually connected state and a disconnecting position for keeping the electric motor and the webbing reel in a mutually disconnected state; a belt reacher not only pivotable in a forward direction of a vehicle by means of a biasing member but also pivotable in a rearward direction of the vehicle to a stored position in response to taking-up of the webbing; a door opening/closing detection section for detecting opening and closing of a door of the vehicle; a seat-belt wearing detection section for detecting wearing, by a vehicle occupant, of the webbing; and a motor control section for controlling the electric motor. Once a change from an opened state to a closed state of the door is detected by the door opening/closing detection section, the control section controls the electric motor so that the webbing is pulled out from the webbing reel at a predetermined speed. Once the wearing of the webbing is detected by the seat-belt wearing detection section while the webbing is being pulled out at the predetermined speed, the control section controls the electric motor to stop pulling-out of the webbing. The predetermined speed is kept at a constant speed for a predetermined initial time period and then caused to gradually decrease from the constant speed.

According to the present invention, control is performed such that the predetermined speed of the webbing is first kept at the constant speed for the predetermined initial time period and then caused to gradually decrease from the constant speed. Such control can effectively reduce an uncomfortable feeling that would be given to the vehicle occupant when the belt reacher falls in the forward direction of the vehicle.

Preferably, the predetermined speed is kept at the constant speed for the predetermined initial time period and then caused to gradually decrease from the constant speed to a final speed, and the motor control section controls the electric motor in such a manner that the clutch member can remain in the disconnecting position and the webbing can be pulled out at the final speed. Because the webbing can be pulled out at the final speed, the vehicle occupant would not feel the pulling-out of the webbing to be heavy when the vehicle occupant starts wearing the webbing.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only with reference to the accompanying drawings, in which:

FIGS. 8A and 8B are diagrams explanatory of control performed at the time of reverse rotational driving of an electric motor of FIG. 6.

DETAILED DESCRIPTION OF THE INVENTION

Figure 1:
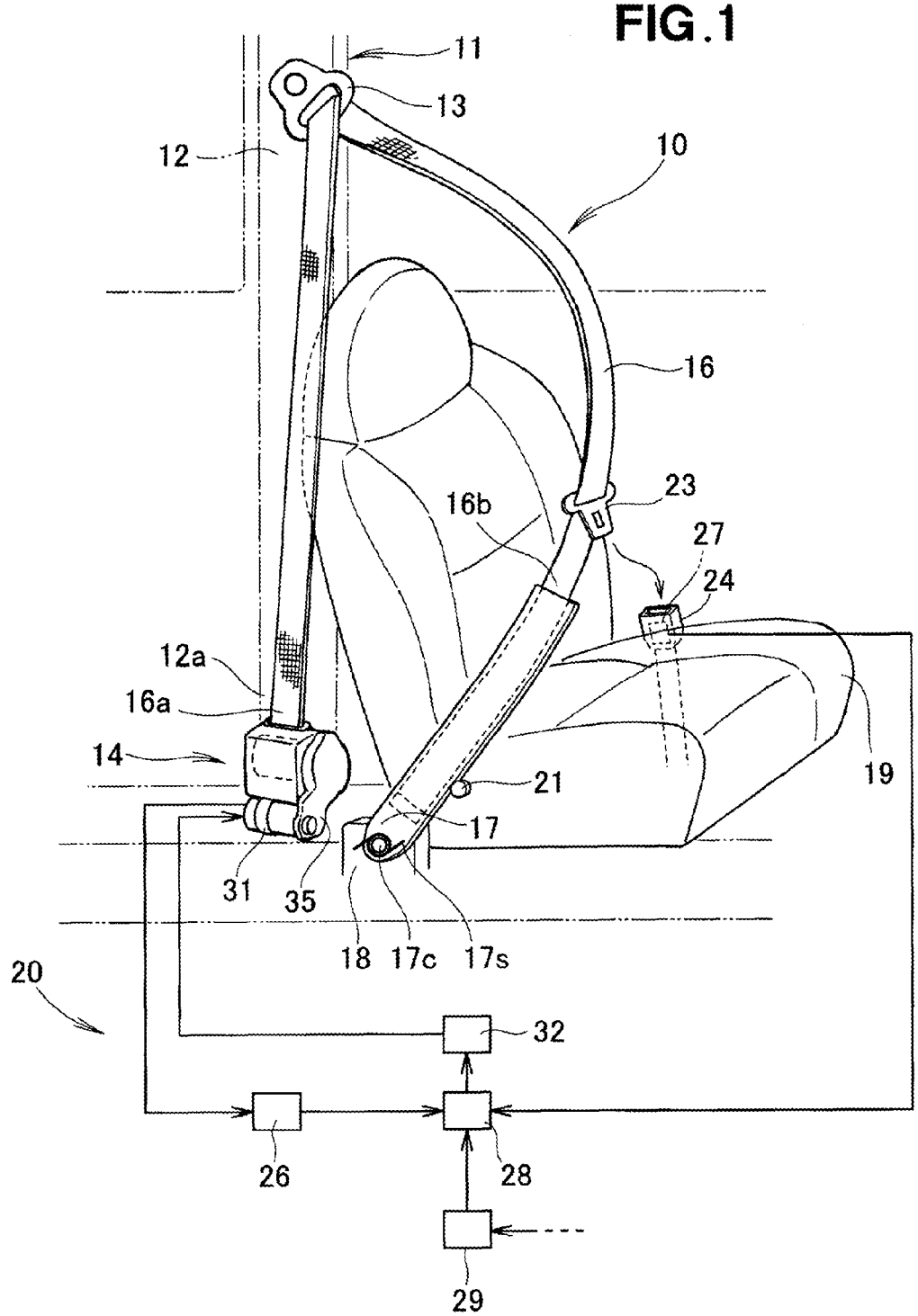
FIG. 1 is a perspective and block diagram showing an example construction of a vehicular seat belt apparatus according to an embodiment of the resent invention.

FIG. 1 is a perspective and block diagram showing an example construction of a vehicular seat belt apparatus according to an embodiment of the resent invention. In the illustrated example of FIG. 1, the seat belt apparatus 10 includes: a take-up device (retractor) 14 provided, for example, on a vehicle body 11; a seat belt webbing (i.e., webbing) 16 wound on the take-up device 14; a tongue plate 23 threaded over the webbing 16; a buckle 24 lockingly engageable with the tongue plate 23; and a control device 20 that controls taking-up of the webbing 16. Note, however, the seat belt apparatus 10 need not necessarily include all of the aforementioned take-up device 14, webbing 16, tongue plate 23, buckle 24 and control device 20 or may include other components in addition to the aforementioned as will be apparent from the following description. In other words, FIG. 1 shows a mere illustrative embodiment of the seat belt apparatus 10 of the present invention, and any suitable component elements of the seat belt apparatus 10 may be chosen in accordance with the object of the present invention.

In the illustrated example of FIG. 1, the take-up device 14 is provided on a lower portion 12a of a pillar 12, such as a B pillar, of the vehicle body 11. The take-up device 14 may include, for example, a motor drive mechanism 35 as a mechanism for taking up (rewinding or pulling in) the webbing 16. One end portion 16a of the webbing 16 is wound on a webbing reel 15, while another end portion 16b of the webbing 16 pulled out from the take-up device 14 is fixed to a belt reacher 17 but also provided on the floor surface of the vehicle body 11 via the belt reacher 17. Note that the webbing 16 is bent by a through-anchor 13 provided on an upper portion of the pillar 12.

Further, in the illustrated example of FIG. 1, the tongue plate 23 is a member movably threaded over the webbing 16 and detachably engageable with the buckle 24 that is also provided on the floor surface of the vehicle body 11. For example, the buckle 24 includes an engagement section (not shown) lockingly engaging the tongue plate 23, and a lock cancellation button (not shown) for canceling the locking engagement between the engagement section (not shown) and the tongue plate 23. Namely, the locking engagement between the engagement section and the tongue plate 23 can be canceled or terminated by a vehicle occupant, such as a driver, pressing the lock cancelation button.

Further, in the illustrated example of FIG. 1, a seat-belt wearing detection section 27 comprises, for example, a buckle switch that is provided, for example, on the buckle 24 or the above-mentioned engagement section. The seatbelt wearing detection section 27, comprising the buckle switch, detects presence/absence of locking engagement between the buckle 24 (the engagement section) and the tongue plate 23, i.e. whether the vehicle occupant is currently wearing the webbing 16 or seat belt. For example, as the vehicle occupant wears the seat belt and puts the tongue plate 23 into locking engagement with the buckle 24, the buckle switch is turned on, and a signal indicative of a result of the detection by the seat-belt wearing detection section 27 is sent to the control device 20.

Further, in the illustrated example of FIG. 1, the control device 20 includes a motor control section 28 that receives the signal from the seat-belt wearing detection section 27 and a signal from a door opening/closing detection section 29. The motor control section 28 can output a control signal to a motor drive section 32 on the basis of these signals, so that, on the basis of the control signal, the motor drive section 32 can generate a drive signal for driving an electric motor 31 of the take-up device 14. The door opening/closing detection section 29, comprising for example a door switch, detects opening/closing of a door (not shown) of the vehicle. For example, the door switch is turned on as the driver closes the vehicle door, and a signal indicative of a result of the detection by the door opening/closing detection section 29 is supplied to the control device 20 or motor control section 28.

Further, in the illustrated example of FIG. 1, the control device 20 may further include a tension detection section 26 for detecting tension of the webbing 16. A signal indicative of a result of the detection by the tension detection section 26 is supplied to the motor control section 28, so that the tension detection section 26 can generate a control signal with the detection result signal from the tension detection section 26 too taken into account. The tension detection section 26 comprises, for example, an electric current sensor that detects a driving current with which the electric motor 31 is being driven to take up the webbing 16.

Furthermore, in the illustrated example of FIG. 1, the belt reacher 17 accommodating the other end portion of the webbing 16 is disposed between a seat 19 and a component of the vehicle body 11, such as the pillar 12 or the door (not shown), and on an opposite side of the seat 19 from the buckle 24, and the belt reacher 17 is provided on the floor surface of the vehicle body 11 via a bracket 18. Further, the belt reacher 17, which is pivotable about a rotation shaft 17c relative to the bracket 18, is normally urged or biased in a forward direction (forward-traveling direction) of the vehicle by a biasing member 17s, such as a spring. In the illustrated example of FIG. 1, the belt reacher 17 is in contact with a stopper 21 provided, for example, on the seat 19 so that it is held in a forwardly-inclined posture.

Figure 2:
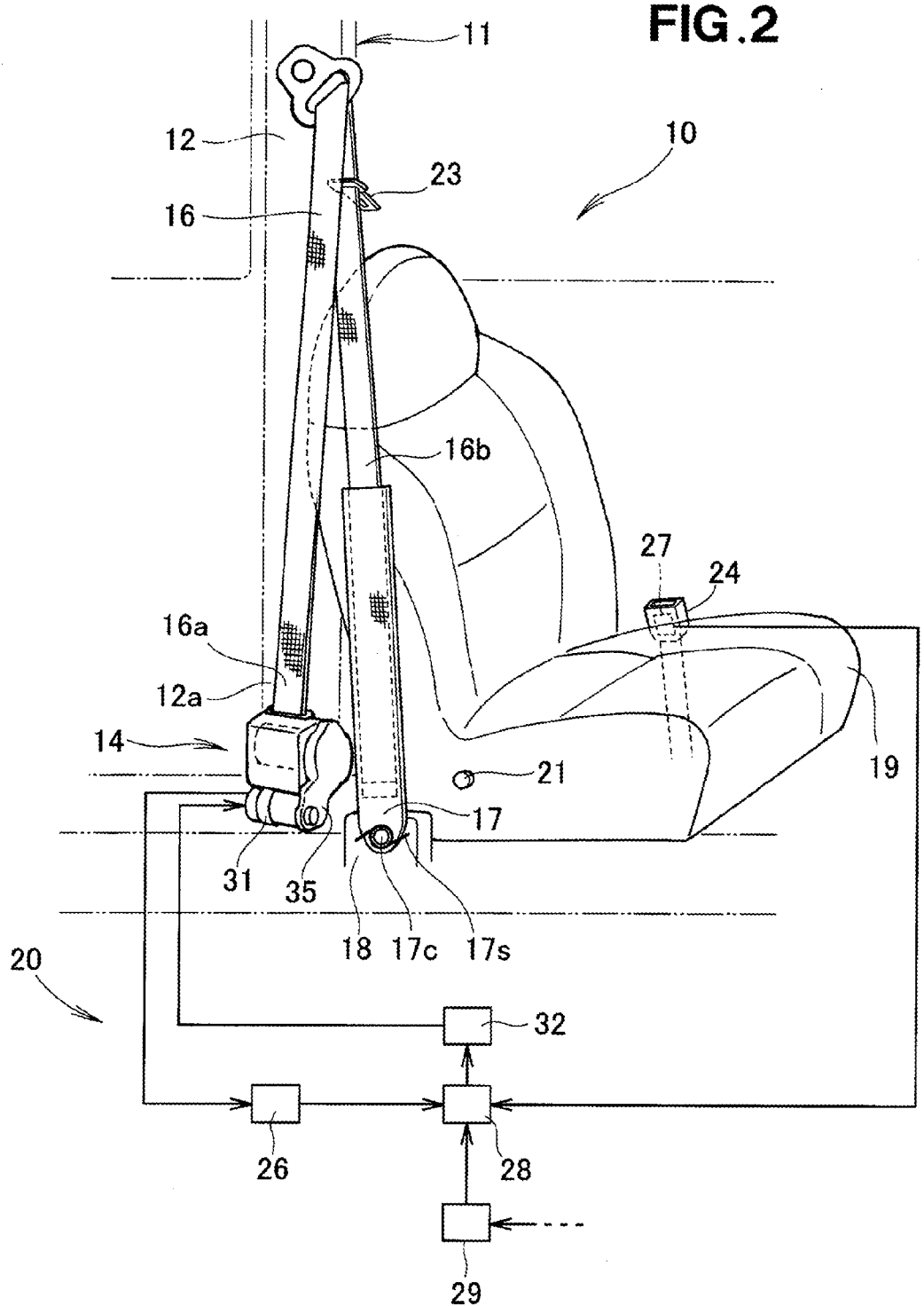
FIG. 2 is a view explanatory of a stored position of a belt reacher provided in the seat belt apparatus shown in FIG. 1.

FIG. 2 is a view explanatory of a stored position of the belt reacher 17 shown in FIG. 1. The belt reacher 17, which is shown in FIG. 1 as held in the forwardly-inclined posture, can pivot about the rotation shaft 17c in a rearward direction (rearward-traveling direction) of the vehicle to the stored position in response to the webbing 16 being taken up by the take-up device 14. As shown in FIG. 2, the belt reacher 17 takes a substantial stand-up posture at the stored position, at which time the biasing force stored in the biasing member 17s becomes the maximum. However, as will be described later, a clutch member 65 moves to a connecting position where it keeps the electric motor 31 and the webbing reel 15 in a mutually connected state and engages a transmission mechanism 44 (FIG. 3), and thus, the belt reacher 17 takes the substantial stand-up posture without falling forward (see FIG. 2). Stated differently, the clutch member 65 disengages from the transmission mechanism 44, so that the belt reacher 17 falls forward as shown in FIG. 1. The following describe behavior of the clutch member 65 and then behavior of the motor control section 28.

Figure 3:
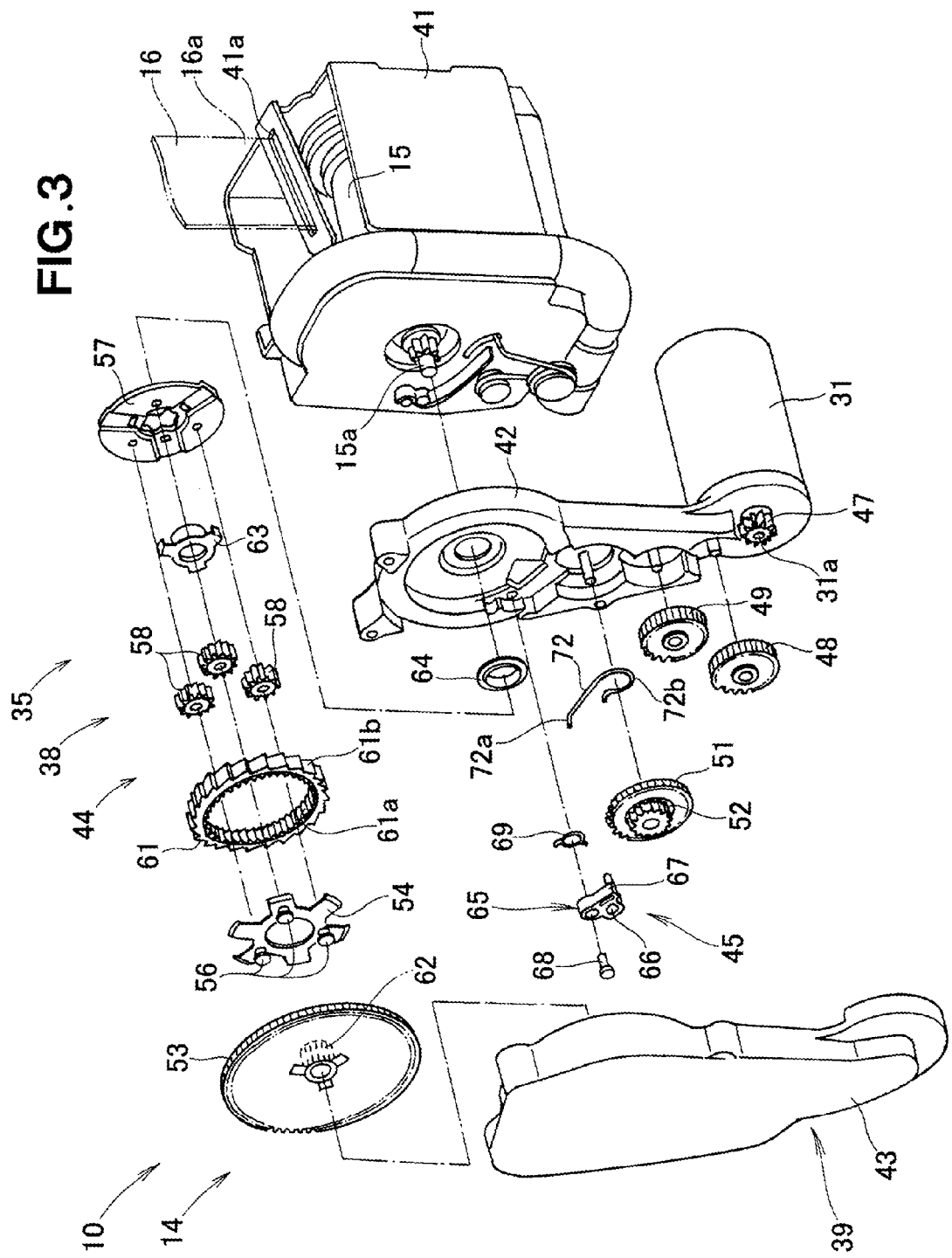
FIG. 3 is an exploded perspective view of a take-up device shown in FIG. 1.

FIG. 3 is an exploded perspective of the take-up device 14 shown in FIG. 1. In the illustrated example of FIG. 3, the take-up device 14 includes a frame 41 mounted on the pillar 12, and the webbing reel 15 is rotatably mounted in the frame 41. The motor drive mechanism 35 is provided outside the frame 41. The webbing 16 is connected at its one end to the webbing reel 15, and the one end portion 16a of the webbing 16 is shown as partly pulled out of the frame 41 through a pull-out opening 41a of the frame 41.

Further, in the illustrated example of FIG. 3, the motor drive mechanism 35 includes a gear housing 35 comprised of an inner case 42 and an outer case 43, and the electric motor 31 is fixed to the inner case 42 of the gear housing 39. Further, a deceleration/clutch mechanism 38 connected to the electric motor 31 is accommodated in the gear housing 39. The deceleration/clutch mechanism 38 includes: the transmission mechanism 44 that connects the drive shaft 31a of the electric motor 31 to the webbing reel 15; and a clutch mechanism 45 that engages the transmission mechanism 44 to keep the electric motor 31 and the webbing reel 15 in the mutually connected state and disengages from the transmission mechanism 44 to keep the electric motor 31 and the webbing reel 15 in the mutually disconnected state.

In an example of the transmission mechanism 44 shown in FIG. 3, a driving gear 47 is mounted on the drive shaft 31a, a first intermediate gear 48 meshes with the driving gear 47, a second intermediate gear 49 meshes with the first intermediate gear 48, a third intermediate gear 51 meshes with the second intermediate gear 49, and a fourth intermediate gear 52 is formed integrally on the third intermediate gear 51. The fourth gear 52 is disposed so as to mesh with a final gear 53. Further, the final gear 53 is rotatably mounted on the outer case 43, and a reduction plate 54 is disposed coaxially with the final gear 53. The reduction plate 54 is connected to a carrier 57 by means of pins 56, so that a corresponding one of planetary gears 58 is rotatably supported on each of the pins 58. The planetary gears 58 mesh with the inner teeth 61a of an internal gear 61 but also mesh with a sun gear 62 of the final gear 53, and the carrier 57, supported via bearings 63 and 64, is connected to a connection shaft 15a of the webbing reel 15.

Further, in the illustrated example of FIG. 3, the clutch mechanism 45 includes: the clutch member (clutch pawl) 65 rotatably mounted on the inner case 42 by means of a pawl pin 68; a return spring 69 mounted on the pawl pin 68; a lever spring 72 mounted on a support shaft 71 (FIG. 4) of the third intermediate gear 51; and a stopper member 74 (FIG. 4) for positioning the clutch member 65 at a position for keeping the electric motor 31 and the webbing reel 15 in the mutually disconnected state. The clutch member 65 has a ratchet locking pawl 67 engageable with a ratchet gear 61b formed on the outer periphery of the internal gear 61. The lever spring 72 has a distal end portion 72a fitted in a fitting hole 66 of the clutch member 65.

Figure 4:
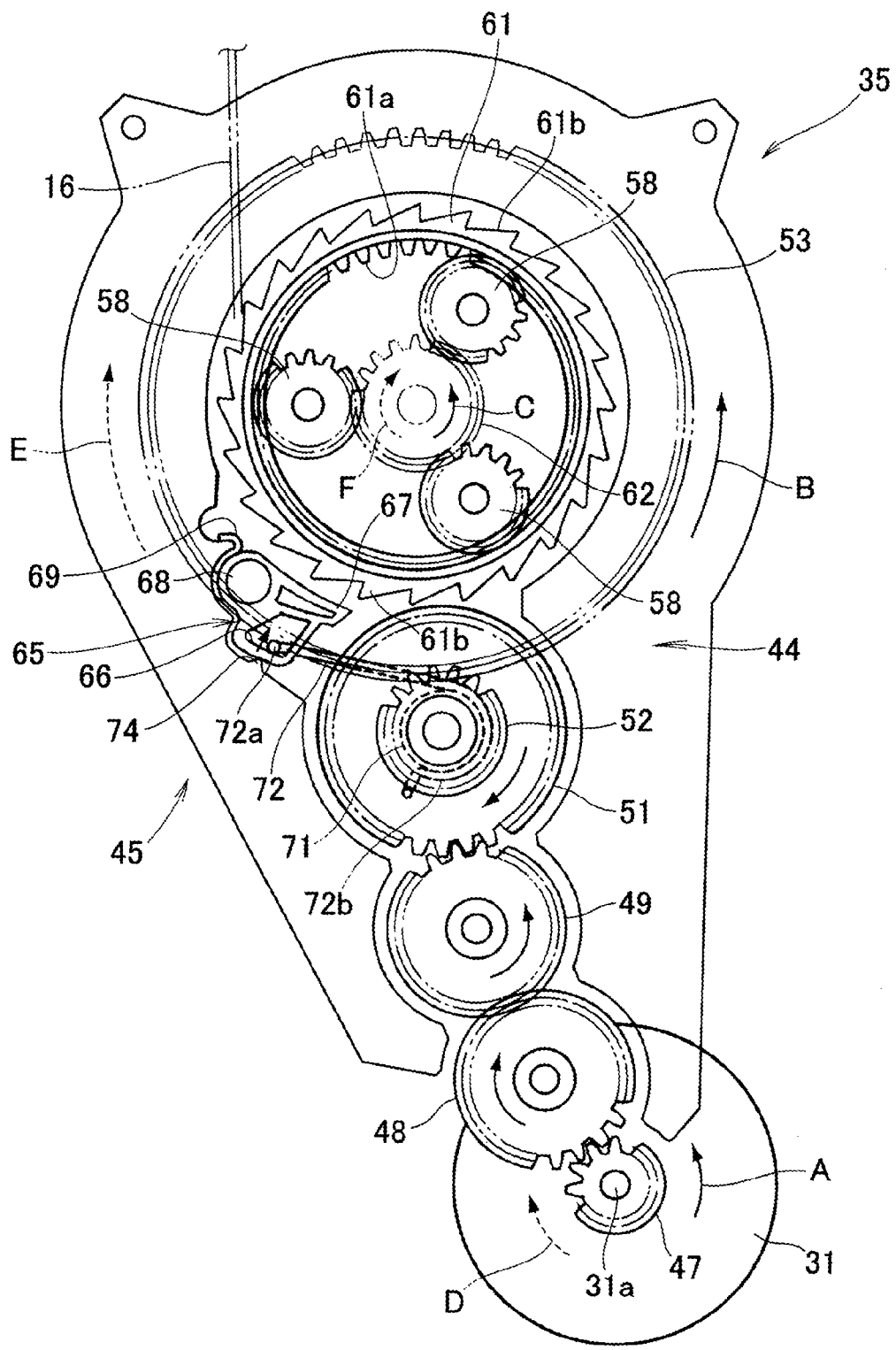
FIG. 4 is a view explanatory of a motor drive mechanism shown in FIG. 3.

FIG. 4 is a view explanatory of the motor drive mechanism 35 shown in FIG. 3. For example, as the rotation shaft 31a of the electric motor 31 in the motor drive mechanism 35 is rotated in one direction (e.g., counterclockwise direction in FIG. 4) as indicated by arrow A, the driving gear 47 and the first to fourth intermediate gears 48, 49, 51 and 52 rotate as indicated by solid-line arrows, so that the final gear 53 rotates as indicated by arrow B and the sun gear 62 rotates as indicated by arrow C.

On the other hand, as the rotation shaft 31a of the electric motor 31 in the motor drive mechanism 35 is rotated in the other direction (e.g., clockwise direction) as indicated by arrow D, the driving gear 47 and the first to fourth intermediate gears 48, 49, 51 and 52 rotate in an opposite direction from the solid-line arrows, so that the final gear 53 rotates as indicated by broken-line arrow E and the sun gear 62 rotates as indicated by broken-line arrow F.

Figure 5:
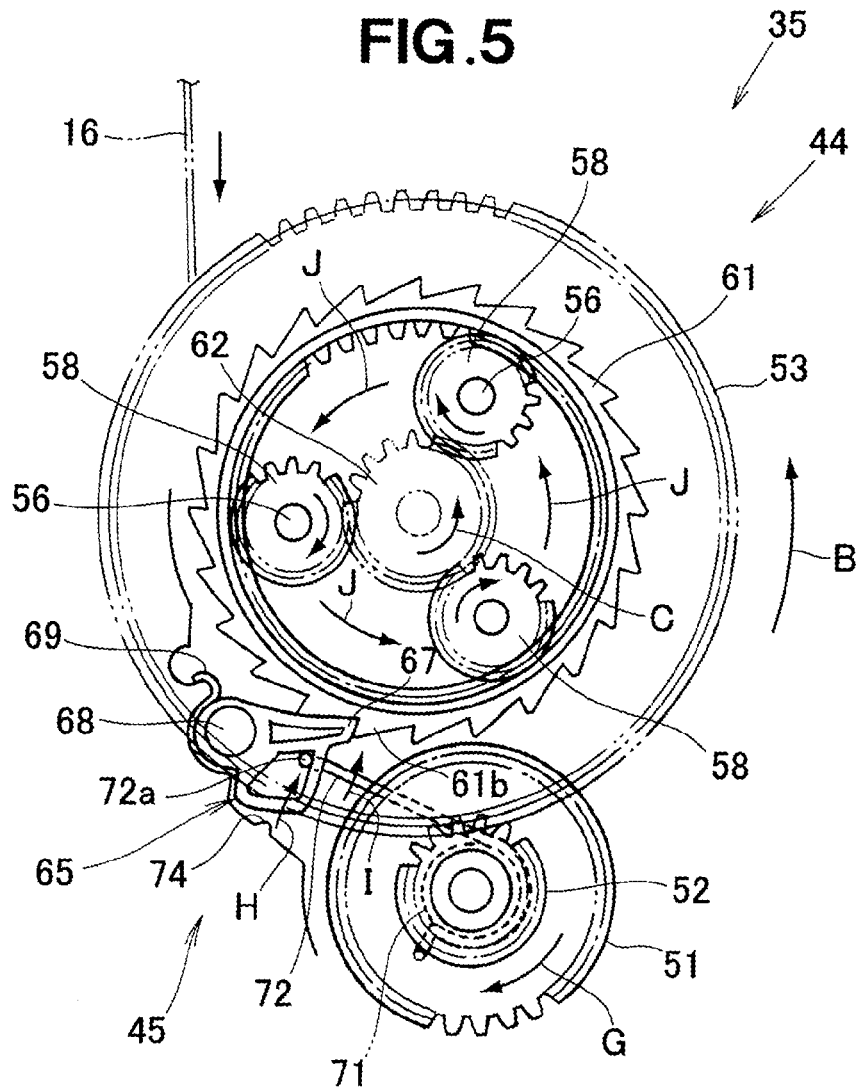
FIG. 5 is a view explanatory of a connecting state of the clutch mechanism shown in FIG. 3.

FIG. 5 is a view explanatory of the connecting state of the clutch mechanism 45 shown in FIG. 3. For example, as the electric motor 31 in the illustrated example of FIG. 5 is rotated in one direction (e.g., counterclockwise direction) as shown in FIG. 4, the third intermediate gear 51 rotates as indicated by arrow G. At that time, the support shaft 71 rotates together with the third intermediate gear 51 as indicated by arrow G, so that the lever spring 72 angularly moves or swings as indicated by arrow H. Because the distal end portion 72a of the lever spring 72 urges the ratchet locking pawl 67 of the clutch member 65 toward the ratchet gear 61b against the biasing force of the return spring 69, the clutch member 65 swings to the connecting position about the pawl pin 68 as indicated by arrow I, so that the locking pawl 67 engages the ratchet gear 61b.

Namely, by the electric motor 31 being rotated in the one direction (e.g., counterclockwise direction), the clutch member 65 can be moved to the connecting position to engage the transmission mechanism 44. By the locking pawl 67 engaging with the ratchet gear 61b in this manner, it is possible to prevent the internal gear 61 from rotating in the clockwise direction.

Further, by the fourth intermediate gear 52 rotating together with the third intermediate gear 51, the final gear 53 rotates as indicated by arrow B, as shown in FIG. 5. Thus, the sun gear 62 rotates as indicated by arrow C, so that the planetary gears 58 rotate about their own axes as indicated by solid-line arrows. Because the internal gear 61 is prevented from rotating in the clockwise direction as noted above, the planetary gears 58 revolve as indicated by arrows J while rotating about their own axes as indicated by the solid-line arrows. By the planetary gears 58 revolve as indicated by arrows J, the carrier 57 of FIG. 3 rotates, for example, in the counterclockwise direction, and the webbing reel 15 of FIG. 3 rotates in the counterclockwise direction so that the webbing 16 is taken up onto the webbing reel 15. Note that, by the webbing 16 being completely taken up while the vehicle occupant is not wearing the webbing 16 or seat belt, the belt reacher 17 of FIG. 2 takes the substantial stand-up posture.

Figure 6:
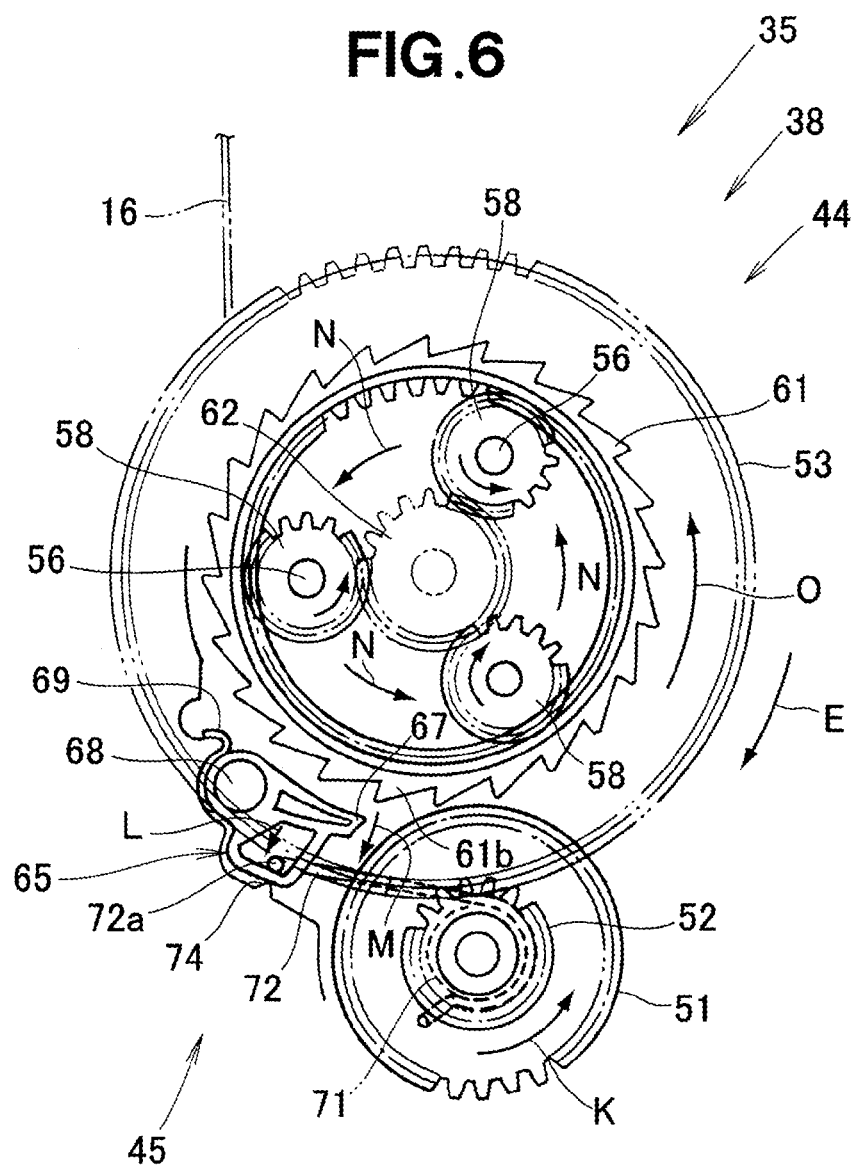
FIG. 6 is a view explanatory of a disconnecting state of the clutch mechanism shown in FIG. 3.

FIG. 6 is a view explanatory of the disconnecting state of the clutch mechanism 45 shown in FIG. 3. As the electric motor 31 in the illustrated example of FIG. 4 is rotated in the other one direction (e.g., clockwise direction) as shown in FIG. 6, the third intermediate gear 51 rotates as indicated by arrow K. At that time, the support shaft 71 rotates together with the third intermediate gear 51 as indicated by arrow K, so that the lever spring 72 angularly moves or swings as indicated by arrow L. Further, with pressing force applied from the distal end portion 72a of the lever spring 72 to the clutch member 65 and the biasing force of the return spring 69, the clutch member 65 moves away from the ratchet gear 61b. Because the clutch member 65 swings to the disconnecting position about the pawl pin 68 as indicated by arrow M, the locking pawl 67 disengages from the ratchet gear 61b.

Namely, by the electric motor 31 being rotated in the other direction (i.e., clockwise direction), the clutch member 65 can be moved to the disconnecting position, at which time the clutch member 65 abuts against the stopper member 74 and thus is positioned at the disconnecting position. Further, because the locking pawl 67 of the clutch member 65 disengages from the ratchet gear 61b, the internal gear 61 becomes rotatable. In addition, continued rotation, in the clockwise direction, of the electric motor 31 allows the webbing 16 to be pulled out from the webbing reel 15. By the webbing 16 being pulled out from the webbing reel 15 while the vehicle occupant is not wearing the webbing 16, the belt reacher 17 falls forward or in the forward traveling direction of the vehicle by the biasing force of the biasing member 17s of FIG. 1.

Figure 7:
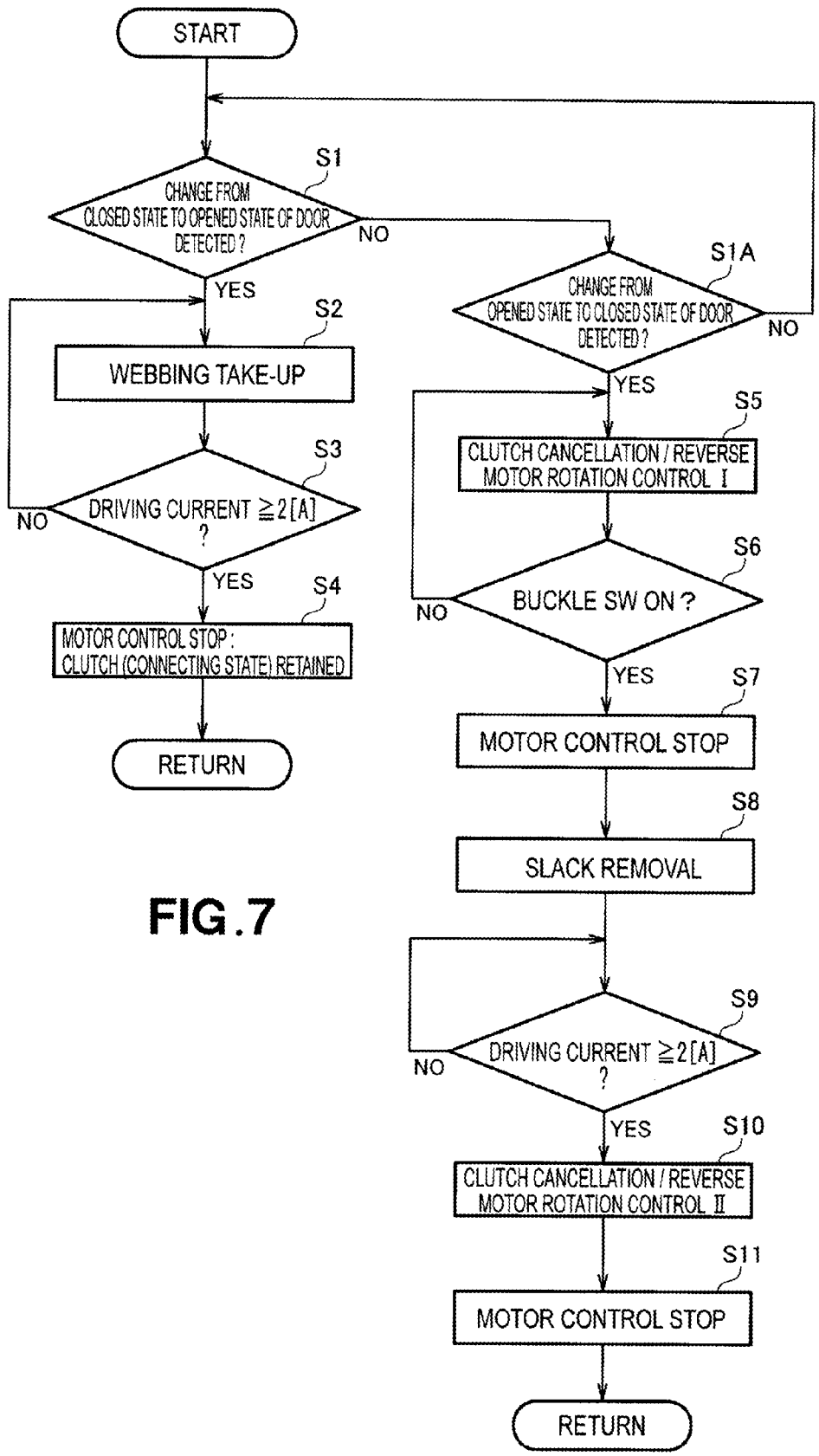
FIG. 7 is a flow chart showing an example operational sequence of a control device shown in FIG. 1.

FIG. 7 is a flow chart showing an example operational sequence executed by the control device 20 shown in FIG. 1. First, at step S1, the motor control section 28 of the control device 20 of FIG. 1 receives the signal indicative of a result of the detection by the door opening/closing detection section 29, which detects opening/closing of the vehicle door, and thereby determines presence/absence of a change from the closed state to the opened state of the door. For example, in the case where the door opening/closing detection section 29 comprises the door switch, the door switch outputs a signal indicative of "Low" or "0" upon detection that the door is closed and outputs a signal indicative of "High" or "1" upon detection that the door is opened.

For example, once the door switch outputs a signal indicative of a change from "Low" to "High", namely, once the door opening/closing detection section 29 detects a change from the closed state to the opened state of the door, the motor control section 28 proceeds to step S2. On the other hand, once the door opening/closing detection section 29 detects a change from the opened state to the closed state of the door at step S1A, the motor control section 28 goes to step S5 to perform clutch cancellation/reverse rotation control I.

At step S2, the motor control section 28 controls the electric motor 31 so that the webbing 16 is taken up onto the webbing reel 15 of FIG. 2. More specifically, the webbing 16 is taken up by the take-up device 14 by the motor control section 28 driving the electric motor 31 in the forward direction (e.g., counterclockwise direction) connected to the webbing reel 15 via the transmission mechanism 44. At that time, the motor control section 28 of FIG. 1 determines, at step S3, whether the positive driving current for driving the electric motor 31 in the forward direction is, for example, a predetermined value "2[A]" or over.

In the case where the tension detection section 26 of FIG. 1 comprises the electric current sensor as noted above and if the webbing 16 is completely taken up onto the webbing reel 15, in other words, if the belt reacher 17 angularly moves in the rearward direction of the vehicle to the stored position and takes a substantial stand-up posture at the stored position, the tension of the webbing 16 becomes great. Thus, in this case, the driving current of the electric motor 31 detected by the current sensor exceeds the value "2[A]". Thus, at step S4 of FIG. 7, the motor control section 28 of FIG. 1 stops the motor controlling operation at step S2 of the electric motor 31 so that the webbing take-up to the take-up device 14 is stopped. If, at that time, the electric motor is temporarily driven in the forward direction to rotate in the counterclockwise direction, and if such temporary forward rotational driving of the electric motor 31 is stopped, the clutch member 65 stays at the connecting position to keep the electric motor 31 and the webbing reel 15 in the mutually connected state, so that the clutch (connecting state) of the clutch mechanism 45 can be retained (see FIG. 5). While steps S2 to S4 are executed, the door switch keeps outputting the "High" signal. In other words, as long as there is no change in the signal output from the door switch as determined at step S2, the motor control section 28 keeps executing step S2 until there occurs a change in the signal.

Then, once the door opening/closing detection section 29, comprising for example the door switch, detects a change from the opened state to the closed state of the door, the motor control section 28 executes step S5. At step S5 of FIG. 7, the motor control section 28 controls the electric motor 31 so that the webbing 16 is pulled out from the webbing reel 15 at a predetermined speed (see FIG. 8A). More specifically, the motor control section 28 drives the electric motor 31 in the reverse direction so that the electric motor 31 rotates in the clockwise direction, and thus, the webbing 16 is pulled out from the take-up device 14. In response to the webbing 16 being pulled out from the take-up device 14, the belt reacher 17 tilts in the forward direction of the vehicle by the biasing force of the biasing member 17s. In other words, the webbing 16 cannot be pulled out by the biasing force of the biasing member 17s alone, and, as the webbing 16 is pulled out by the electric motor 31, the belt reacher 17 tilts or falls forward by an amount corresponding to the pulled-out length of the webbing 16 and in accordance with a reverse-rotating speed of the electric motor 31.

FIGS. 8A and 8B are views explanatory of control performed at the time of the reverse rotational driving of the electric motor 31 of FIG. 6. The motor control section 28 of FIG. 2 generates a control signal indicative of a duty cycle (Duty) as indicated by a solid-line in FIG. 8A, and the motor drive section 32 drives the electric motor 31 in the reverse direction in accordance with the control signal generated by the motor control section 28. More specifically, when a change from the opened state to the closed state of the door has been detected, the duty cycle is first kept at a constant start duty cycle of, for example, 10[%] for a predetermined initial time period and then gradually decreases from the 10[%] initial duty cycle; however, at that time, the duty cycle does not decrease down to 0[%]. In other words, the duty cycle is set to decrease, after the initial time period, from the 10[%] start duty cycle down to a duty cycle (final duty cycle) greater than 0[%] and then keep the final duty cycle in a time period following the initial time period. However, by execution of steps S6 and S7 of FIG. 7, the duty cycle returns to 0[%], i.e. the reverse rotational driving of the electric motor 31 is terminated, once the buckle switch is turned on.

A vertical solid line in the illustrated example of FIG. 8A indicates that the buckle switch has been turned on while the duty cycle is indicating the final duty cycle, a vertical broken line in FIG. 8A indicates that the buckle switch has been turned on while the duty cycle is indicating the start duty cycle, and a vertical one-dot-chain line indicates that the buckle switch has been turned on while the duty cycle is gradually decreasing from the start duty cycle to the final duty cycle. Namely, in order to allow the vehicle occupant to easily hold the webbing 16 or the tongue plate 24, the electric motor 31 is driven in the reverse direction to tilt or fall forward the belt reacher 17. Thus, if the vehicle occupant completes wearing of the webbing 16 or seat belt before the belt reacher 17 contacts the stopper 21 of FIG. 1, the reverse rotational driving of the electric motor 31 may be terminated before the belt reacher 17 contacts the stopper 21.

As indicated by the solid-line in FIG. 8A, the duty cycle gradually decreases, for example, from 10[%] (i.e., start duty cycle). If the duty cycle is kept at the 10[%] start duty cycle, the belt reacher 17 falls forward at a speed corresponding to a reverse rotation speed, based on the start duty cycle, of the electric motor 31, and is then suddenly stopped by the stopper 21. In other words, if the duty cycle does not decrease from (i.e., is kept at) the 10[%] start duty cycle, then the sudden stop of the rotation, about the rotation shaft 17c, of the belt reacher 17 would occur and give an uncomfortable feeling to the vehicle occupant, such as the driver.

By the motor control section 28 controlling the electric motor 31, for example, in accordance with the duty cycle indicated in FIG. 8A, the webbing 16 is pulled out from the webbing reel 15 at a predetermined speed. The "predetermined speed" at which the webbing 16 is pulled out is determined in accordance with the solid-line duty cycle indicated in FIG. 8A, and thus, the predetermined speed of the webbing 16 is kept at a first constant speed for a predetermined time period and then gradually decreases from the first constant speed. Such control can effectively reduce an uncomfortable feeling that would be given to the vehicle occupant when the belt reacher 17 falls forward.

Further, the duty cycle shown in FIG. 8A is set to be kept at the final duty cycle, which is greater than 0[%], after having decreased from the 10[%] start duty cycle to the final duty cycle unless the buckle switch is turned on, so that the predetermined speed at which the webbing 16 is pulled out can be kept at a final speed (second constant speed) after having decreased from the first constant speed to the final speed (second constant speed). Although the vehicle occupant normally finishes wearing the webbing 16 or seat belt after the belt reacher 17 falls forward, some vehicle occupant may take time before the vehicle occupant actually starts wearing webbing 16 or seat belt. Thus, according to the instant embodiment, the electric motor 31 is controlled in such a manner that even such a vehicle occupant can pull out the webbing 16 at the final speed (second constant speed) as long as the final duty cycle is applied.

Note that an actual value of the predetermined speed of the webbing 16 decreases down to zero once the webbing 16 is pulled out to the maximum. However, because the instant embodiment of the seat belt apparatus 10 does not include a rotation angle sensor, it cannot detect an amount of the webbing 16 having been pulled out from the webbing reel 15 (i.e., pulled-out amount of the webbing 16 from the webbing reel 15). Thus, with such a seat belt apparatus 10 which does not detect a pulled-out amount or take-up amount of the webbing 16, the clutch member 65 can stay in the disconnecting position the final duty cycle maintained. In other words, if the vehicle occupant starts wearing the webbing 16 or seat belt before the webbing 16 is pulled out to the maximum, that vehicle occupant would not feel the pulling-out of the webbing 16 to be heavy. Likewise, if the pulling-out of the webbing 16 is temporarily stopped before the webbing 16 is pulled out to the maximum and when the vehicle occupant then restarts wearing the webbing 16 or seat belt, the vehicle occupant would not feel the pulling-out of the webbing 16 to be heavy owing to the presence of the final duty cycle.

After the vehicle occupant completes the wearing of the webbing 16 or seat belt with the buckle switch turned on, the motor control section 28 controls the electric motor 31 at steps S8 and S9 of FIG. 7 in such a manner as to remove undesired slack of the webbing 16. More specifically, the motor control section 28 drives the electric motor 31 in the forward direction until the positive driving current exceeds "2[A]". Because the clutching or connecting state of the clutch mechanism 45 is maintained by the forward rotational driving of the electric motor 31, the motor control section 28 controls the electric motor 31 at step S10 (clutch cancellation/reverse rotation control II) of FIG. 7, upon completion of the slack removal by the electric motor 31, in such a manner that the clutching or connecting state of the clutch mechanism 45 is canceled or terminated (see FIG. 8B). More specifically, as shown in FIG. 8B, the motor control section 28 drives the electric motor 31 in the reverse direction with a duty cycle of, for example, 20[%] for a short time period (e.g., 200 ms). Upon elapse of the 200 [ms] time period, the motor control section 28 stops the reverse rotational driving of the electric motor 31 with a duty cycle of 0[%] (step S11 in FIG. 7).

Finally, it should be appreciated that the above-described embodiment is merely illustrative and the present invention is not limited to such an illustrative embodiment, and that a person skilled in the art may modify the illustrative embodiment within the scope defined in the appended claims.

Obviously, various minor changes and modifications of the present invention are possible in light of the above teaching. It is therefore to be understood that within the scope of the appended claims the invention may be practiced otherwise than as specifically described.

What is claimed is:

1. A seat belt apparatus comprising:
   a webbing reel capable of taking up a webbing;
   an electric motor connected to the webbing reel via a transmission mechanism;
   a clutch member movable between a connecting position for keeping the electric motor and the webbing reel in a mutually connected state and a disconnecting position for keeping the electric motor and the webbing reel in a mutually disconnected state;
   a belt reacher not only pivotable in a forward direction of a vehicle by means of a biasing member but also pivotable in a rearward direction of the vehicle to a stored position in response to taking-up of the webbing;
   a door opening/closing detection section for detecting opening and closing of a door of the vehicle;
   a seat-belt wearing detection section for detecting wearing, by a vehicle occupant, of the webbing; and
   a motor control section for controlling the electric motor,
   wherein, once a change from an opened state to a closed state of the door is detected by the door opening/closing detection section, the motor control section controls the electric motor so that the webbing is pulled out from the webbing reel at a predetermined speed,
   wherein, once the wearing of the webbing is detected by the seat-belt wearing detection section while the webbing is being pulled out at the predetermined speed, the control section controls the electric motor to stop pulling-out of the webbing, and
   wherein the predetermined speed is kept at a constant speed for a predetermined initial time period and then caused to gradually decrease from the constant speed.

2. The seat belt apparatus according to claim 1, wherein the predetermined speed is kept at the constant speed for the predetermined initial time period and then caused to gradually decrease from the constant speed to a final speed, and
   wherein the motor control section controls the electric motor in such a manner that the clutch member can remain in the disconnecting position and the webbing can be pulled out at the final speed.

* * * * *